(12) United States Patent
Froeschle et al.

(10) Patent No.: US 7,387,330 B2
(45) Date of Patent: Jun. 17, 2008

(54) AIR GUIDING SYSTEM FOR A VEHICLE

(75) Inventors: Mathias Froeschle, Ostfildern (DE); Joachim Paul, Stuttgart (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/691,950

(22) Filed: Mar. 27, 2007

(65) Prior Publication Data

US 2007/0228771 A1 Oct. 4, 2007

(30) Foreign Application Priority Data

Mar. 28, 2006 (DE) .................. 10 2006 014 262

(51) Int. Cl.
*B62D 35/00* (2006.01)

(52) U.S. Cl. .............. 296/180.5; 180/903; 296/26.12; 296/180.1

(58) Field of Classification Search .............. 105/1.3; 180/903; 244/213; 296/26.01, 26.12, 26.13, 296/180.1, 180.2, 180.3, 180.4, 180.5
See application file for complete search history.

(56) References Cited

U.S. PATENT DOCUMENTS

| | | | | | |
|---|---|---|---|---|---|
| 1,274,986 | A | * | 8/1918 | Carolin | 244/213 |
| 1,762,002 | A | * | 6/1930 | Van De Putte | 244/213 |
| 3,791,468 | A | * | 2/1974 | Bryan, Jr. | 180/69.2 |
| 4,773,692 | A | * | 9/1988 | Schleicher et al. | 296/180.5 |
| 4,925,236 | A | * | 5/1990 | Itoh et al. | 296/180.5 |
| 5,013,081 | A | * | 5/1991 | Cronce et al. | 296/180.1 |
| 5,120,105 | A | * | 6/1992 | Brin et al. | 296/180.5 |
| 5,536,062 | A | * | 7/1996 | Spears | 296/180.3 |
| 6,382,708 | B1 | | 5/2002 | Erdelitsch et al. | |
| 6,672,651 | B1 | * | 1/2004 | Shuen | 296/180.5 |
| 2002/0074826 | A1 | * | 6/2002 | Presley | 296/180.1 |
| 2007/0001482 | A1 | | 1/2007 | Larson | |

FOREIGN PATENT DOCUMENTS

| DE | 30 19 150 A1 | 11/1981 |
|---|---|---|
| DE | 43 05 090 A1 | 8/1994 |
| DE | 10 2004 030 571 A1 | 1/2006 |

(Continued)

OTHER PUBLICATIONS

German Office Action dated Dec. 8, 2006 with an English translation of the pertinent portions (six (6) pages).

(Continued)

*Primary Examiner*—D. Glenn Dayoan
*Assistant Examiner*—Paul A Chenevert
(74) *Attorney, Agent, or Firm*—Crowell & Moring LLP

(57) ABSTRACT

An air guiding system for a vehicle, particularly for a passenger car, arranged in a rear area of the vehicle and having at least one central main air guiding element that can be displaced from a moved-in inoperative position into a moved-out operative position. Lateral auxiliary air guiding elements are displaceable together with the, or each, central main air guiding element. The auxiliary air guiding elements can be swiveled with respect to the, or each, main air guiding element about at least two pivots fixed to the main air guiding element and in each case at least two pivots fixed to the auxiliary air guiding elements laterally beside the main air guiding element.

11 Claims, 4 Drawing Sheets

FOREIGN PATENT DOCUMENTS

| | | | |
|---|---|---|---|
| DE | 10 2005 030 203 A1 | 1/2007 | |
| EP | 271757 A2 * | 6/1988 | ................ 244/46 |
| EP | 1 118 529 A2 | 7/2001 | |
| EP | 1 138 582 A2 | 10/2001 | |
| EP | 1 738 996 A2 | 1/2007 | |
| JP | 60163773 A * | 8/1985 | ............. 296/180.5 |
| JP | 03000578 A * | 1/1991 | ............. 296/180.1 |
| JP | 03281484 A * | 12/1991 | ............. 296/180.1 |

OTHER PUBLICATIONS

European Search Report dated Jul. 5, 2007 W/English translation of pertinent portion (five (5) pages).

* cited by examiner

AIR GUIDING SYSTEM FOR A VEHICLE

CROSS REFERENCE TO RELATED APPLICATIONS

This application claims the benefit of priority under 35 U.S.C. § 119 to German Patent Application No. 10 2006 014 262 filed Mar. 28, 2006, the disclosure of which is incorporated herein by reference in its entirety.

BACKGROUND AND SUMMARY OF THE INVENTION

The present invention relates to an air guiding system for a vehicle, particularly a passenger car, which is arranged in a rear area of the vehicle and comprises at least one central main air guiding element, which can be displaced from a moved-in inoperative position into a moved-out operative position, lateral auxiliary air guiding elements being displaceable together with the or each central main air guiding element.

DE 30 19 150 A1 shows a vehicle air guiding system arranged in an upper rear area of the vehicle and having an air guiding element that can be displaced from an inoperative position, in which it is integrated in the shaping of the rear area flush with the surface, into a moved-out operative position. The air guiding element is constructed as an aerofoil which, by way of an operating device, can be displaced or changed from the inoperative position into the operative position and vice-versa.

DE 43 05 090 A1 also discloses a vehicle air guiding system arranged in a rear area of the vehicle and having an air guiding element that can be displaced from an inoperative position into a moved-out operative position. The air guiding element is formed by a rear spoiler arranged in a recessed receiving device of the vehicle body and displaceable by an operating device from the inoperative position to the operative position and vice-versa.

The air guiding systems disclosed in the above-mentioned DE 30 19 150 A1 and DE 43 05 090 A1, increase the rear axle output coefficient ($c_{ah}$-value) of the motor vehicle while the drag coefficient ($c_w$-value) remains the same or is improved, with these known air guiding elements each having the same transverse dimension in the inoperative position and in the operative position.

Yet unpublished German Patent Document DE 10 2005 030 203, discloses a vehicle air guiding system having a central main air guiding element as well as two lateral auxiliary air guiding elements. The auxiliary air guiding elements enlarge the transverse dimension of the air guiding system in the operative position and particularly the rear axle output coefficient can be further increased. The adjusting movement of the lateral auxiliary air guiding elements with respect to the central main air guiding element takes place when the main air guiding element has been displaced from the inoperative position into the operative position. The adjustment of the auxiliary air guiding elements with respect to the main air guiding element therefore takes place after, and uncoupled from, the displacement of the main air guiding element.

An object of the present invention is to provide a novel vehicle air guiding system by allowing the auxiliary air guiding elements to be swiveled with respect to the, or each, main air guiding element about at least two pivots fixed to the main air guiding element and about in each case at least two pivots fixed to the auxiliary air guiding elements laterally beside the main air guiding element, in order to change them from an also moved-in inoperative position into an also moved-out operative position.

According to an advantageous further development of the air guiding system according to the present invention, the adjustment of the lateral auxiliary air guiding elements is coupled to the displacement of the or each central main air guiding element during its change or their change from the inoperative position into the operative position and vice versa. Thereby, the lateral auxiliary air guiding elements can be changed isochronously or simultaneously from the inoperative into the operative position or from the operative position into the inoperative position with the displacement of the, or each, central main air guiding element with respect to the or each main air guiding element. In this case, the lateral auxiliary air guiding elements are swiveled with respect to the, or each, central main air guiding element laterally beside the main air guiding element. Within a very short time and in a simple manner, the transverse dimension of the air guiding system according to the invention can thereby be adapted.

Preferably, each auxiliary air guiding element is swivelable by way of an operating device disposed on the main air guiding element. A coupling device is applied to the operating device of each auxiliary air guiding element, and mechanically couples the swivel-type adjustment of the lateral auxiliary air guiding elements with respect to the central main air guiding element to the displacement of the central main air guiding element.

According to an advantageous further development, the auxiliary air guiding elements enlarge the transverse dimension and the longitudinal dimension of the main air guiding element or the air guiding system. The simultaneous enlargement of the transverse dimension and the longitudinal dimension of the main air guiding element or the air guiding system is particularly advantageous aerodynamically.

Other objects, advantages and novel features of the present invention will become apparent from the following detailed description of the invention when considered in conjunction with the accompanying drawings.

DETAILED DESCRIPTION OF THE DRAWINGS

FIGS. 1 to 8 show different views of a rear area 10 of a vehicle body, the rear area 10 comprising a rear window 11 surrounded by a vehicle body part 12 in the front, the rear and on the sides.

Figure 1:
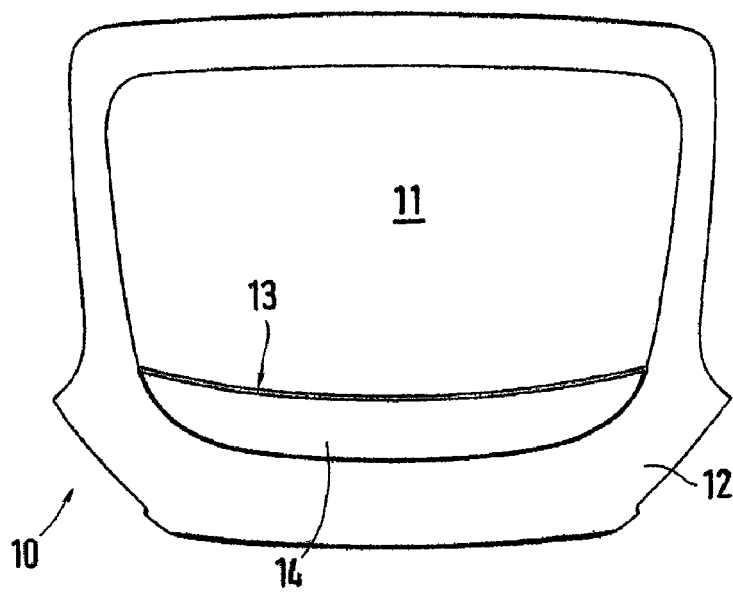
FIG. 1 is a plan view of a rear area of a vehicle with an air guiding system according to the invention shown in the inoperative position.
Figure 2:
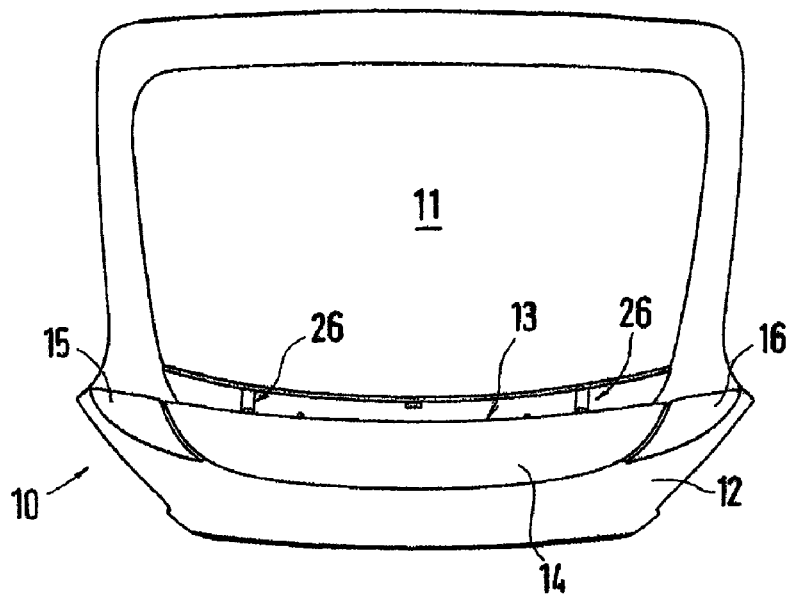
FIG. 2 is a view similar to FIG. 1 but with the air guiding system shown in the operative position.
Figure 3:
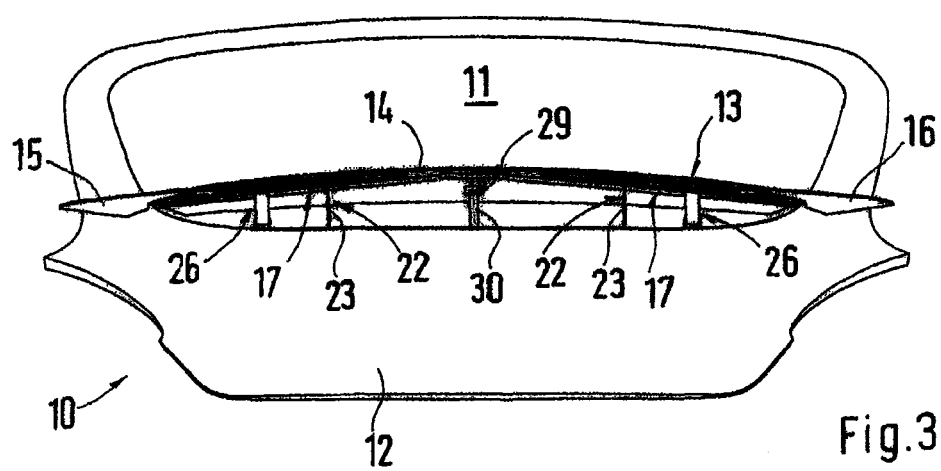
FIG. 3 is a rear view of the rear area of FIGS. 1 and 2 with the air guiding system shown in the operative position.
Figure 4:
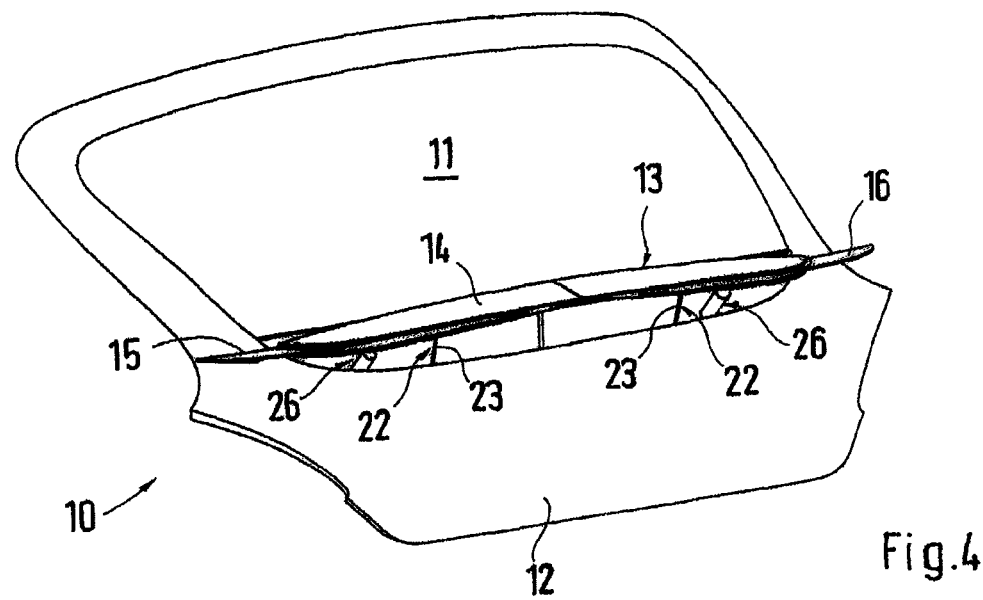
FIG. 4 is a perspective view diagonally from the rear of the rear area of FIGS. 1 to 3 with the air guiding system shown in the operative position.
Figure 5:
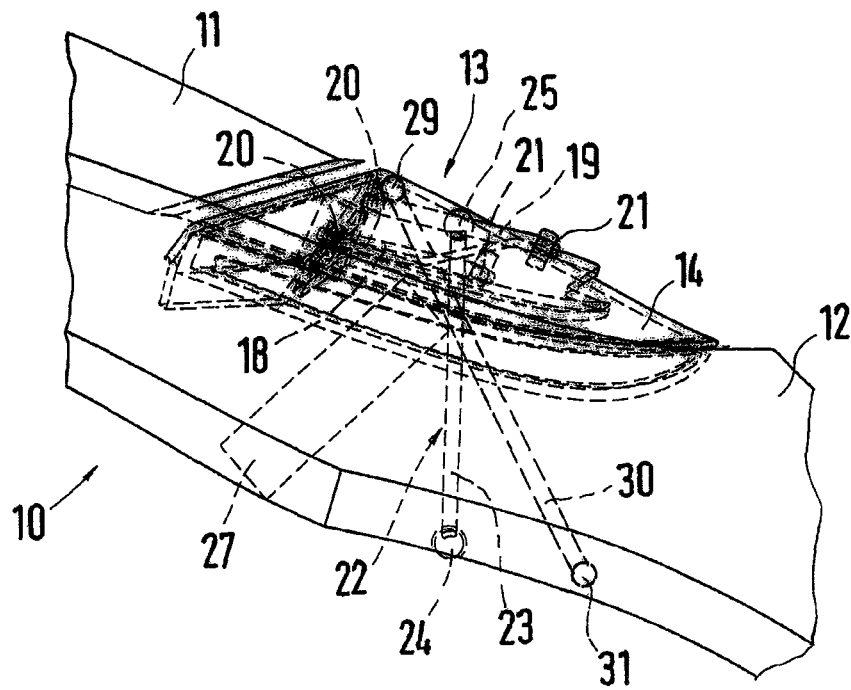
FIG. 5 is a side view of the rear area of FIGS. 1 to 4 with the air guiding system shown in the inoperative position.
Figure 6:
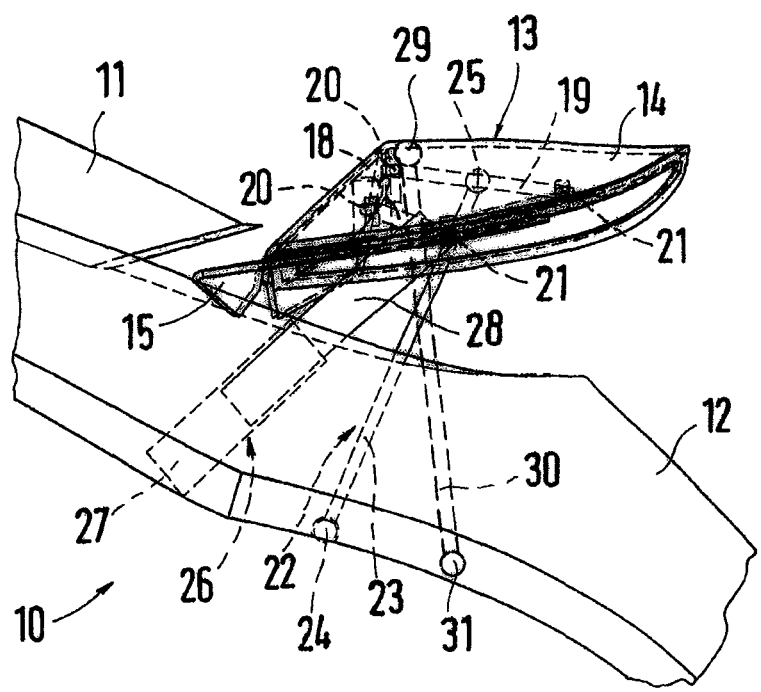
FIG. 6 is a side view of the rear area of FIGS. 1 to 5 with the air guiding system shown in the operative position.
Figure 7:
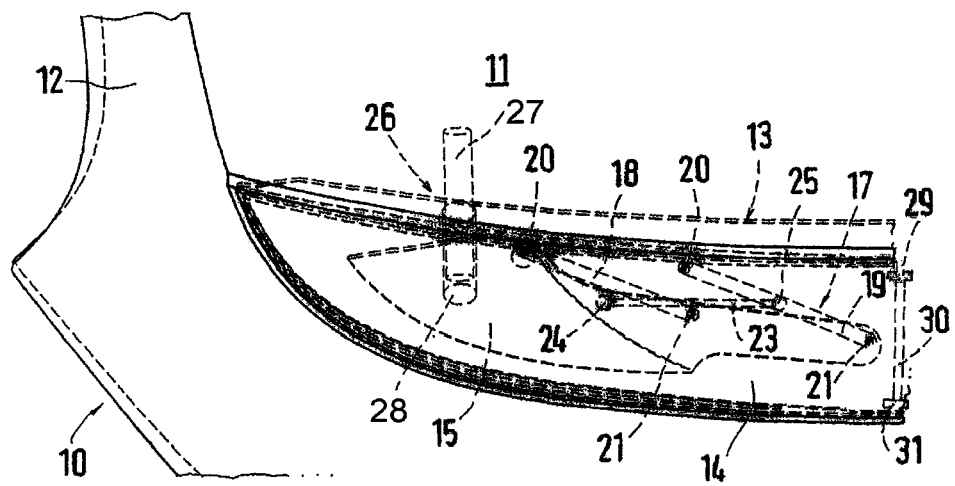
FIG. 7 is a schematic plan view of a cutout of the air guiding system according to the invention shown in the inoperative position.

An air guiding system 13 is positioned in a rearward area of the vehicle body part 12 of the rear area 10 constructed as a fastback and therefore below the rear window 11. FIGS. 1, 5 and 7 show the air guiding system 13 in an inoperative position and FIGS. 2, 3, 4, 6 and 8 showing the latter in an operative position.

In the inoperative position of the air guiding system 13 (see FIGS. 1, 5, 7), the latter is integrated flush with the surface in the rear area 10 of the vehicle. In contrast, in the operative position of the air guiding system 13 (see FIGS. 2, 3, 4, 6, 8), the latter is moved out of the surface contour of the rear area 10.

In the illustrated embodiment, the air guiding system 13 according to the present invention has a central main air guiding element 14 as well as two lateral auxiliary air guiding elements 15 and 16. The lateral auxiliary air guiding elements 15, 16 are visible only in the operative position (see FIGS. 2, 3, 4, 6, 8) of the air guiding system 13. In the inoperative position, the lateral auxiliary air guiding elements 15, 16 are covered by the central main air guiding element 14.

During the change or displacement from the inoperative position into the operative position or from the operative position into the inoperative position, the central main air guiding element 14 is lifted and lowered in the manner of an upward-directed swinging motion and thereby swiveled, with the two lateral auxiliary air guiding elements 15, 16 going along in this movement of the central main air guiding element 14.

In the preferred illustrated embodiment of the invention, isochronously with the above-mentioned upward-directed swinging motion of the central main air guiding element 14, which the two lateral auxiliary air guiding elements 15, 16 carry out together with the central main air guiding element 14, the lateral auxiliary air guiding elements 15, 16 can be swiveled with respect to the central main air guiding element 14 laterally beside the main air guiding element 14, in order to move them simultaneously with the displacement of the main air guiding element from the inoperative position into the operative position from an also moved-in inoperative position into an also moved-out operative position. The swinging motion of the two auxiliary air guiding elements 15, 16 takes place such that the two auxiliary air guiding elements 15, 16 are positioned in the swiveled-out operative position laterally beside the main air guiding element 14, and then enlarge at least the transverse dimension of the main air guiding element 14 or of the air guiding system 13. The swinging motion of each lateral auxiliary air guiding element 15, 16 with respect to the central main air guiding element 14 takes place about at least two pivots fixed to the main air guiding element and about at least two pivots fixed to the auxiliary air guiding elements.

For the implementation of the swinging motion of the lateral auxiliary air guiding elements 15, 16 with respect to the central main air guiding element 14, each of the lateral auxiliary air guiding elements 15, 16 is swivelable by way of an operating device 17 disposed on the main air guiding element 14. Each of the operating devices 17 (see particularly FIGS. 7, 8) comprises two operating elements 18, 19 that form a four-bar linkage. In the following, the operating elements 18, 19 are called operating rods but which may also be called operating guide rods.

Figure 8:
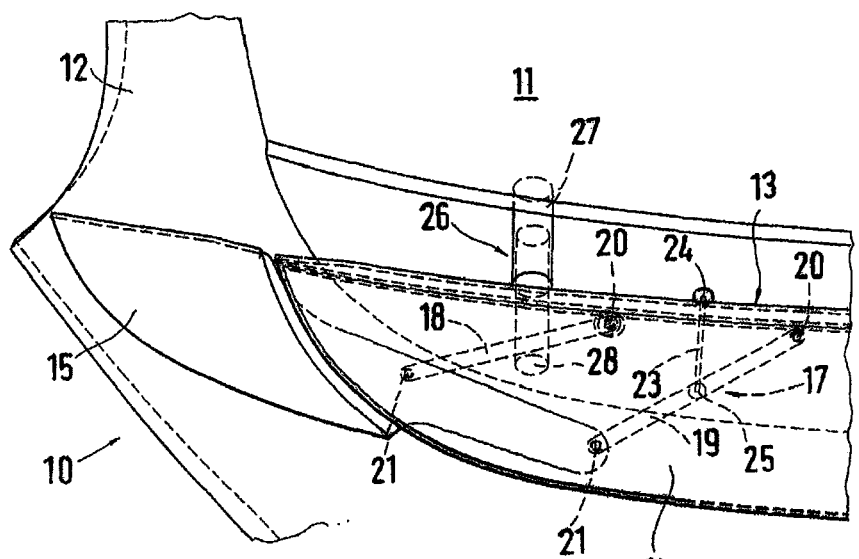
FIG. 8 is a view of the cutout of FIG. 5 with the air guiding system according to the invention shown in the operative position.

Each of the operating rods 18, 19 of the operating device 17 of the lateral auxiliary air guiding element 15 illustrated in FIGS. 7 and 8 is articulatingly connected by at a first end by way of one joint 20 respectively with the main air guiding element 14 and, at an opposite second end, is articulatingly connected by way of one joint 21 respectively with the respective lateral auxiliary air guiding element 15. The joints 20, 21 of the operating rods 18, 19 define a four-bar linkage that determines the swinging motion of the lateral auxiliary air guiding element 15 directed transversely to the longitudinal direction of the vehicle. The four-bar linkage defined by the operating rods 18, 19 comprises two pivots 20 fixed to the main air guiding element as well as two pivots 21 fixed to the auxiliary air guiding element, which finally define the swinging motion of the auxiliary air guiding element 15.

A coupling device designated generally by numeral 22 is applied to the operating device 17 of each lateral auxiliary air guiding element 15, 16, and mechanically couples the swivel-type adjustment of the lateral auxiliary air guiding elements 15, 16 with respect to the central main air guiding element 14 to the displacement of the central main air guiding element 14. In the illustrated embodiment, each coupling device 22 is formed by a coupling element 23 which will be called a coupling rod hereinafter but which may also be called a coupling guide rod.

The coupling rod 23 of each coupling device 22 is connected at a first end by a joint 24 with the vehicle body part and, at an opposite second end, by a joint 25, and is connected with one of the two operating rods 19 of the operating device 17 of the respective lateral auxiliary air guiding element 15 or 16.

The joints 24, 25, by way of which the coupling rods 23 are connected on one side with the vehicle body part 12 and on the other side with the operating device 17 of the respective lateral auxiliary air guiding element 15, 16, are particularly constructed as ball joints. As demonstrated particularly in FIGS. 7 and 8, each coupling rod 23 is applied in an articulated manner approximately to the center of the operating rod 19 by the joint 25. The coupling rod 23 may also be applied to the operating rod 19 offset to its center by the joint 25. This particular way in which the coupling rod is applied is a function of the desired translation.

For displacing the main air guiding element 14 from the inoperative position into the operative position and vice-versa from the operative position into the inoperative position, an operating device is also assigned to the main air guiding element 14. In the illustrated embodiment, this operating device is formed by two telescopic operating elements 26. A telescopic operating element 26 is applied to both sides of the main air guiding element 14, each of the telescopic operating elements 26 having a tube 27 fixed to the vehicle body in which a tube 28 fixed to the main air guiding element 14 is telescopically guided. For moving the tube 28 fixed to the main air guiding element out of the tube 27 of the telescopic operating elements 26, which tube 27 is fixed to the vehicle body, the main air guiding element 14, together with the lateral auxiliary air guiding elements 15, 16 can be moved in the manner of the above-mentioned upward-directed swinging motion out of the surface contour of the rear area 10 and can be changed from the inoperative position into the operative position. A rotatory motion component is superimposed on the translatory motion component of the main guiding element 14 defined by the telescopic operating elements 26.

This superimposed rotatory motion component takes place about a joint 29 of a coupling rod 30 fixed to the main air guiding element. The coupling rod 30, at an end situated opposite the joint 29, is applied to the vehicle body part 12 by a joint 31 fixed to the vehicle body part. The superimposition of the translatory motion component defined by the telescopic operating elements 26 with the rotary motion component about the joint 29 finally results in the upward-directed swinging motion of the main air guiding element 14 which the auxiliary air guiding elements 15, 16 carry out together with the main air guiding element 14.

The coupling rods 23 cause the swinging motion of the lateral auxiliary air guiding elements 15, 16 relative to the central main air guiding element 14, which motion is directed transversely to the longitudinal direction of the vehicle, to be isochronously or simultaneously initiated. This movement swivels the lateral auxiliary air guiding elements 15, 16 into a position relative to the main air guiding element 14, in which they are arranged laterally beside the main air guiding element 14 while enlarging at least the transverse dimension of the main air guiding element 14 and thus of the air guiding system 13.

According to the preferred embodiment illustrated in FIGS. 1 to 8, the two lateral auxiliary air guiding elements 15, 16 of the air guiding system 13 according to the invention are therefore swiveled with respect to the central main air guiding element 14 by one planar four-bar linkage respectively while enlarging the transverse dimension of the air guiding system 13. Each of the planar four-bar linkages is formed by the two operating rods 18, 19 connected by one joint 20 respectively with the main air guiding element 14 by way of one joint 21, respectively, with the respective auxiliary air guiding element 15 or 16. The coupling rod 23 applied to an operating rod 19 of the four-bar linkage, is, on one side, articulatingly connected with this operating rod 18 and on the other side is articulatingly connected with the vehicle body part 12 by ball joints. In this case, the coupling rod 23 couples the swinging motion of the lateral auxiliary air guiding elements 15, 16 with respect to the central main air guiding element 14 to the swinging motion of the main air guiding element 14 during its change from the inoperative position into the operative position or vice-versa from the operative position into the inoperative position. The swinging motion of the auxiliary air guiding elements 15, 16 is thereby mechanically coupled to the swinging motion of the main air guiding element 14.

In the illustrated embodiment, the operating rods 18, 19 of the operating devices 17 are applied by the joints 20 to the forward section of the main air guiding element 14. In this case, the swinging motion of the lateral auxiliary air guiding elements 15 directed to the side with respect to the central main air guiding element 14 takes place diagonally from the rear to the front. Alternatively, it is also contemplated that the operating rods 18, 19 of the operating devices 17 with the respective joints 20 are applied to a rearward end of the main air guiding element 14. In that case, the swinging motion of the lateral auxiliary air guiding elements 15, 16 with respect to the main air guiding element 14 takes place in a mirror-inverted manner toward the front.

Another alternative involves swinging the lateral auxiliary air guiding elements 15, 16 laterally out from below the main air guiding element 14.

As a result of the above-described mechanical coupling of the swinging motion of the main air guiding element 14 to the swinging motion of the lateral auxiliary air guiding elements 15, 16 with respect to the main air guiding element 14, only a single drive is required in order to change the central main air guiding element 14 as well as the lateral auxiliary air guiding elements 15, 16 from the inoperative position into the operative position as well as vice-versa from the operative position into the inoperative position.

In contrast, it is also further contemplated to assign separate drives to the auxiliary air guiding elements 15, 16, so as to eliminate the mechanical coupling devices 22. In that case, the drives of the lateral auxiliary air guiding elements 15, 16 are preferably coupled with the drive of the main air guiding element 14 on the control side, in order to again ensure the isochronous or simultaneous displacement of the main air guiding element 14 and of the lateral auxiliary air guiding elements 15, 16.

In the latter case, the auxiliary air guiding elements can then also be moved uncoupled from the main air guiding element, in order to carry out the adjusting movements of the main air guiding element and of the auxiliary air guiding elements, for example, successively. Likewise, for example, speed-dependent adjustments of the auxiliary air guiding elements can also be implemented in this case, which adjustments are independent of a speed-dependent adjustment of the main air guiding element.

In the illustrated embodiment, the lateral auxiliary air guiding elements 15, 16 are contoured such that, in the moved-out operating position, they enlarge only the transverse dimension of the main air guiding element 14 or of the air guiding system 13. In contrast, it is also contemplated in this respect to contour the lateral auxiliary air guiding elements 15, 16 on a rear edge such that they continue to simultaneously enlarge, at least in sections, the longitudinal dimension of the main air guiding element 14 and thus of the air guiding system 13.

For avoiding movements of the lateral auxiliary air guiding elements 15, 16 in the vertical direction because of loads due to wind pressure or the like, in the moved-in position and/or the moved-out position, the auxiliary air guiding elements 15, 16 can be held in receiving devices which are constructed at the main air guiding element 14. As an alternative, the auxiliary air guiding elements 15, 16 can also be guided in a connecting link guide or the like which, in any position of the auxiliary air guiding elements 15 and 16, engages with the latter and prevents a movement in the vertical direction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle air guiding system arranged in a rear area of a vehicle, comprising at least one central main air guiding element, displaceable between a moved-in inoperative position into a moved-out operative position, and lateral auxiliary air guiding elements displaceable together with the at least one central main air guiding element, wherein the auxiliary air guiding elements are arranged to be swivelable with respect to the at least one central main air guiding element about at least two pivots fixed to the at least one central main air guiding element and at least two pivots fixed to the auxiliary air guiding elements laterally beside the at least one central main air guiding element, in order to change these auxiliary air guiding elements between an also moved-in inoperative position and an also moved-out operative position.

2. The vehicle air guiding system according to claim 1, wherein each of the lateral auxiliary air guiding elements is swivelable via an operating device on the at least one central main air guiding element.

3. The vehicle air guiding system according to claim 2, wherein each respective operating device has at least two operating elements comprising a four-bar linkage.

4. The vehicle air guiding system according to claim 3, wherein the at least two operating elements are operatively connected at a first end by the respective at least two pivots fixed to the, at least one central main air guiding element and at a second end by the respective at least two pivots fixed to the a respective one of the lateral auxiliary air guiding elements.

5. The vehicle air guiding system according to claim 1, wherein the lateral auxiliary air guiding elements are changeable isochronously or simultaneously with displacement of the at least one central main air guiding element between the also moved-in inoperative position and the also moved-out operative position.

6. The vehicle air guiding system according to claim 5, wherein a coupling device is associated with the operating device of each of the lateral auxiliary air guiding elements and mechanically couples a swivel-type adjustment of the lateral auxiliary air guiding elements with respect to the at least one central main air guiding element to the displacement of the at least one central main air guiding element.

7. The vehicle air guiding system according to claim 6, wherein each coupling device has a coupling element which, on one side, is operatively connected by a joint with an operating element of the operating device and, on the other side, is operatively connected by a joint with a vehicle body part.

8. The vehicle air guiding system according to claim 1, wherein the at least one central main air guiding element is displaceable by an operating device between a moved in inoperative position and a moved-out operative position in an upward-directed swinging motion of the main air guiding element, and the laterally directed swinging motion, with the auxiliary air guiding elements carrying out the upward-directed swinging motion of the auxiliary air guiding elements with respect to the at least one central main air guiding element being coupled to the upward-directed swinging motion of the main air guiding element such that the swinging motions are able to be carried out isochronously or simultaneously.

9. The vehicle air guiding system according to claim 8, wherein the upward-directed swinging motion of the main air guiding element has an upward-directed translatory motion component and a rotatory motion component.

10. The vehicle air guiding system according to claim 9, wherein the rotatory motion component of the upward-directed swinging motion of the main air guiding element takes place about joints such that coupling elements are applied to operating elements.

11. The vehicle air guiding system according to claim 1, wherein the auxiliary air guiding elements are not visible in the inoperative position of the main air guiding element.

* * * * *